United States Patent
Bowden et al.

(10) Patent No.: US 12,273,234 B2
(45) Date of Patent: Apr. 8, 2025

(54) PROVISIONING EDGE LAYER TO CLOUD LAYER CONNECTIVITY FOR ASSET DEVICES

(71) Applicant: HONEYWELL INTERNATIONAL INC., Charlotte, NC (US)

(72) Inventors: Jason Bowden, Roswell, GA (US); Ambika Khatri, Bangalore (IN); Mani Kumar Bhasuri, Alpharetta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/188,583

(22) Filed: Mar. 23, 2023

(65) Prior Publication Data

US 2024/0323077 A1    Sep. 26, 2024

(51) Int. Cl.
*H04L 41/0806* (2022.01)
*G06F 9/54* (2006.01)

(52) U.S. Cl.
CPC .......... *H04L 41/0806* (2013.01); *G06F 9/547* (2013.01)

(58) Field of Classification Search
CPC .............................. H04L 41/0806; G06F 9/547
See application file for complete search history.

(56) References Cited

U.S. PATENT DOCUMENTS

| 2014/0082050 | A1* | 3/2014 | Chud | G06F 8/61 |
| | | | | 709/203 |
| 2016/0088041 | A1* | 3/2016 | Nichols | H04W 8/26 |
| | | | | 370/312 |
| 2017/0192414 | A1* | 7/2017 | Mukkamala | H04L 43/045 |
| 2018/0063244 | A1* | 3/2018 | Maturana | G06F 9/5072 |
| 2019/0379544 | A1* | 12/2019 | Suthar | H04L 63/08 |
| 2022/0187847 | A1* | 6/2022 | Cella | G06Q 10/0635 |

* cited by examiner

*Primary Examiner* — Oleg Survillo
*Assistant Examiner* — Monishwar Mohan
(74) *Attorney, Agent, or Firm* — Alston & Bird LLP

(57) ABSTRACT

Various embodiments described herein relate to provisioning edge layer to cloud layer connectivity for asset devices. In an embodiment, an application programming interface (API) payload to facilitate network provisioning related to a set of industrial assets within an industrial network system is received. Additionally, a set of subscription domain features included in the API payload is mapped to a set of application content features associated with a cloud platform and a gateway profile for configuring a connection between the industrial network system and the cloud platform is generated based at least in part on the set of application content features. Execution of the gateway profile via a gateway device implemented as a network node between the industrial network system and the cloud platform can also be caused.

17 Claims, 12 Drawing Sheets

PROVISIONING EDGE LAYER TO CLOUD LAYER CONNECTIVITY FOR ASSET DEVICES

TECHNICAL FIELD

The present disclosure relates generally to network provisioning for asset devices, and more particularly to provisioning edge layer to cloud layer connectivity for asset devices.

BACKGROUND

Network provisioning generally involves configuration of a network to allow devices and/or servers access to the network. For example, connectivity and/or security measures for a network can be configured via network provisioning to allow devices and/or servers access to the network. However, due to the complexity and architecture of typical networks, providing connectivity between an edge layer and a cloud layer for asset devices is generally difficult and time-consuming. As such, there are numerous technical challenges related to network provisioning for asset devices.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors and a memory having program code stored thereon. The program code, in execution with the at least one processor, causes the system to receive an application programming interface (API) payload that facilitates network provisioning related to a set of industrial assets within an industrial network system. In one or more embodiments, the API payload comprises at least a set of subscription domain features associated with the industrial network system. In one or more embodiments, in response to receiving the API payload, the program code, in execution with the at least one processor, also causes the system to map the set of subscription domain features to a set of application content features associated with a cloud platform. In one or more embodiments, in response to receiving the API payload, the program code, in execution with the at least one processor, also causes the system to generate, based at least in part on the set of application content features, a gateway profile for configuring a connection between the industrial network system and the cloud platform. In one or more embodiments, in response to receiving the API payload, the program code, in execution with the at least one processor, also causes the system to cause execution of the gateway profile via a gateway device implemented as a network node between the industrial network system and the cloud platform.

In another embodiment, a computer-implemented method is provided. The computer-implemented method provides for receiving an API payload that facilitates network provisioning related to a set of industrial assets within an industrial network system. In one or more embodiments, the API payload comprises at least a set of subscription domain features associated with the industrial network system. In one or more embodiments, in response to receiving the API payload, the computer-implemented method also provides for mapping the set of subscription domain features to a set of application content features associated with a cloud platform. In one or more embodiments, in response to receiving the API payload, the computer-implemented method also provides for generating, based at least in part on the set of application content features, a gateway profile for configuring a connection between the industrial network system and the cloud platform. In one or more embodiments, in response to receiving the API payload, the computer-implemented method also provides for causing execution of the gateway profile via a gateway device implemented as a network node between the industrial network system and the cloud platform.

In yet another embodiment, a computer program product comprises at least one non-transitory computer-readable storage medium having computer-readable program code portions stored therein. The computer-readable program code portions comprise an executable portion configured to receive an API payload that facilitates network provisioning related to a set of industrial assets within an industrial network system. In one or more embodiments, the API payload comprises at least a set of subscription domain features associated with the industrial network system. In one or more embodiments, in response to receiving the API payload, the computer-readable program code portions also comprise an executable portion configured to map the set of subscription domain features to a set of application content features associated with a cloud platform. In one or more embodiments, in response to receiving the API payload, the computer-readable program code portions also comprise an executable portion configured to generate, based at least in part on the set of application content features, a gateway profile for configuring a connection between the industrial network system and the cloud platform. In one or more embodiments, in response to receiving the API payload, the computer-readable program code portions also comprise an executable portion configured to cause execution of the gateway profile via a gateway device implemented as a network node between the industrial network system and the cloud platform.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
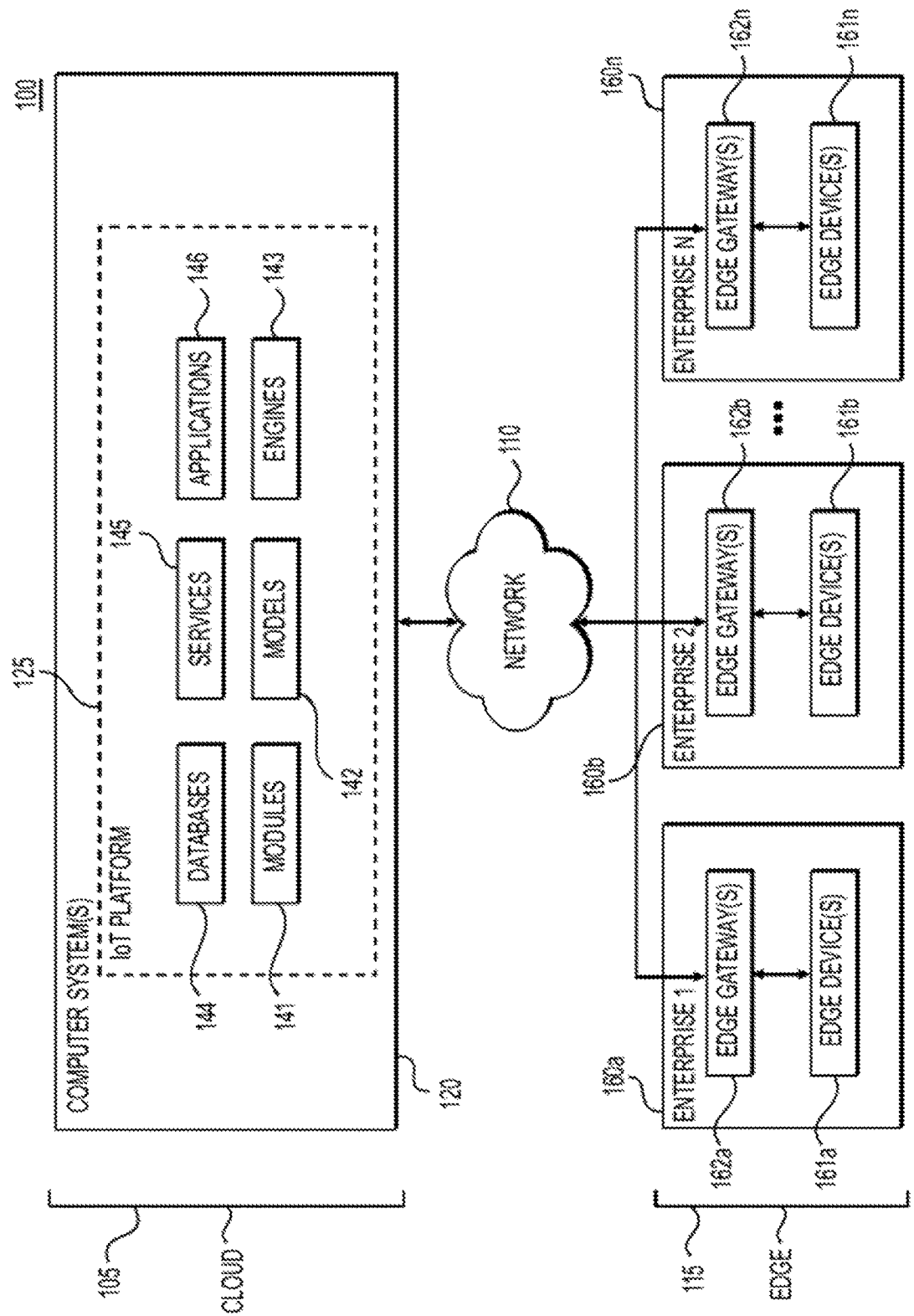
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can." "may." "could." "should," "would." "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Network provisioning generally involves configuration of a network to allow devices and/or servers access to the network. For example, connectivity and/or security measures for a network can be configured via network provisioning to allow devices and/or servers access to the network. However, due to the complexity and architecture of typical networks, providing connectivity between an edge layer and a cloud layer for asset devices is generally difficult and time-consuming. For example, an industrial network (e.g., an industrial network associated with industrial automation and control systems) often includes thousands of assets such as, for example, sensors, input/output modules, controllers, firewall devices, supervisory nodes, application nodes, and/or other assets. Furthermore, different assets in an industrial network often include different sets of software and/or different sets of hardware connected to the same network or a different network via switches, routers, firewall devices, etc. As such, there are numerous technical challenges related to network provisioning for asset devices.

Thus, to address these and/or other issues, improvements related to provisioning edge layer to cloud layer connectivity for asset devices is provided. The cloud layer can be a cloud platform that manages a set of software technologies configured for execution via a gateway device. The gateway device can be a network node implemented between the edge layer and the cloud layer to provide connectivity between the edge layer and the cloud layer. For example, the gateway device can provide connectivity between the asset devices (e.g., asset devices of an industrial IoT system) associated with the edge layer and one or more applications provided by the cloud. In various embodiments, the gateway device can be provisioned based on a subscription for one or more asset devices and/or an industrial IoT system associated with the edge layer.

In various embodiments, configuration of an entitlement for the edge layer can be described in metadata to indicate how to provision the gateway device to provide edge to cloud connectivity and/or security for a particular commercial subscription order. In various embodiments, features of a subscription can be intelligently determined based on one or more verticals (e.g., industrial performance management functionality, building performance management functionality, warehouse performance management functionality, aerospace performance management functionality, etc.) associated with the cloud layer. For example, proper provisioning procedures in the form of an automated workflow of steps can be dynamically created for the gateway device. The provisioning procedures can configure the gateway device to communicate with the cloud layer to provide the respective services for the verticals. In various embodiments, a set of code can be configured to provision edge to gateway connectivity for a diverse set of verticals by dynamically provisioning different software configurations that are specific for each vertical solution of the cloud layer. For example, the set of code can be included in an application programming interface (API) payload that represents a structured subscription to be processed via the gateway device. The structured subscription can then be translated into a set of automated procedures that execute to provision the gateway device.

In various embodiments, a connection between an industrial IoT system and a cloud platform can be dynamically configured based a mapping between a set of subscription domain features associated with the industrial IoT system and a set of application content features associated with the cloud platform and/or the gateway device. In various embodiments, the configuration of the connection between the industrial IoT system and the cloud platform can be authorized via a subscription key. Additionally, execution of one or more actions that initiate and/or execute with respect to a gateway device and/or the industrial IoT system can be triggered based on the mapping.

In one or more embodiments, the set of subscription domain features can be extracted from an API payload and/or an enriched event provided by the industrial IoT system. For example, set of subscription domain features can be extracted from metadata included in the API payload and/or the enriched event. Additionally, the set of subscription domain features can include, but is not limited to, an industrial network identifier, a domain identifier, a domain name, a tenant identifier (e.g., a unique identifier for slicing software for the industrial IoT system), a product identifier, a location identifier, a site identifier, a building identifier, a factory identifier, an asset identifier, SKU data (e.g., product information, enterprise vertical information, etc.) related to a product subscription for the industrial network system, asset information for one or more assets, an asset digital twin specification for one or more assets, account information for one or more users authorized to access and/or modify the industrial network system, metadata associated with one or more assets, a sensor identifier associated with one or more assets, and/or one or more other subscription domain features.

In one or more embodiments, the set of subscription domain features can be translated into a set of automated procedures to be executed via the gateway device. For example, the set of automated features can be configured as a generate gateway profile for execution by the gateway device. In certain embodiments, a set of extensibility features for generating extensible object data for a dashboard visualization can be determined based on the mapping. Additionally or alternatively, machine learning functionality, data processing functionality, and/or data enrichment functionality for the industrial IoT system can be enabled via successful connection between the industrial IoT system and the cloud platform. For example, in response to successful connection between the industrial IoT system and the cloud platform via the gateway device, the cloud platform can be authorized to provide machine learning functionality, data processing functionality, and/or data enrichment functionality for the industrial IoT system.

Accordingly, with the network provisioning disclosed herein, performance of a network (e.g., an industrial IoT network) and/or assets within a network are improved. For instance, by employing one or more techniques disclosed herein, network performance, asset performance and/or process performance is optimized. Additionally, performance of a processing system associated with network provisioning is improved by employing one or more techniques disclosed herein. For example, a number of computing resources, a number of a storage requirements, and/or number of errors associated with network provisioning is reduced by employing one or more techniques disclosed herein. Additionally or alternatively, likelihood of a cyberattack with respect to a network (e.g., an industrial network) can be reduced by employing the network provisioning disclosed herein.

FIG. 1 illustrates an exemplary networked computing system environment 100, according to the present disclosure. As shown in FIG. 1, networked computing system environment 100 is organized into a plurality of layers including a cloud 105, a network 110, and an edge 115. For example, the cloud 105 can be a cloud layer, the network 110 can be a network layer, and the edge 115 can be an edge layer. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
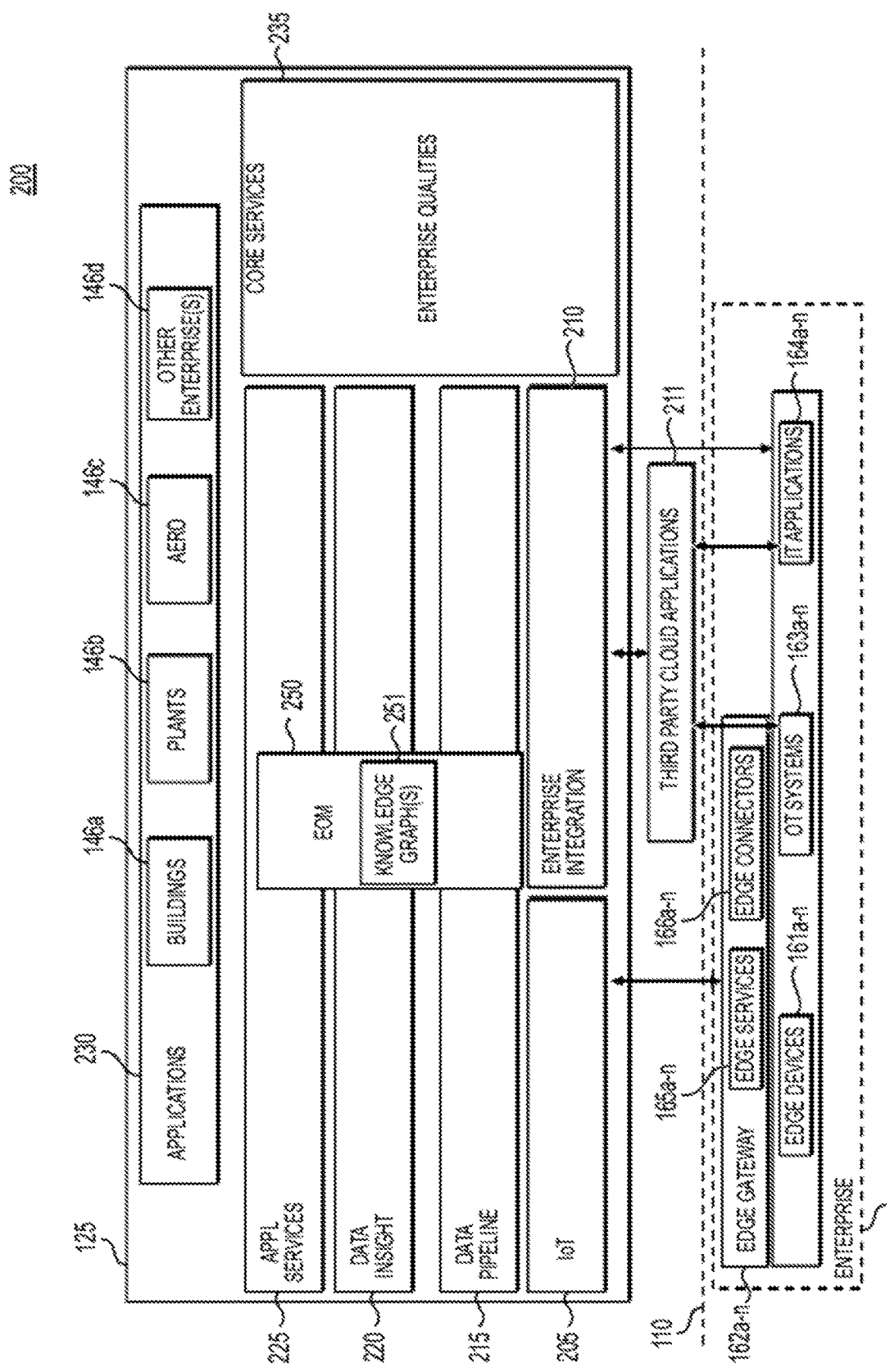
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, an "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 125. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
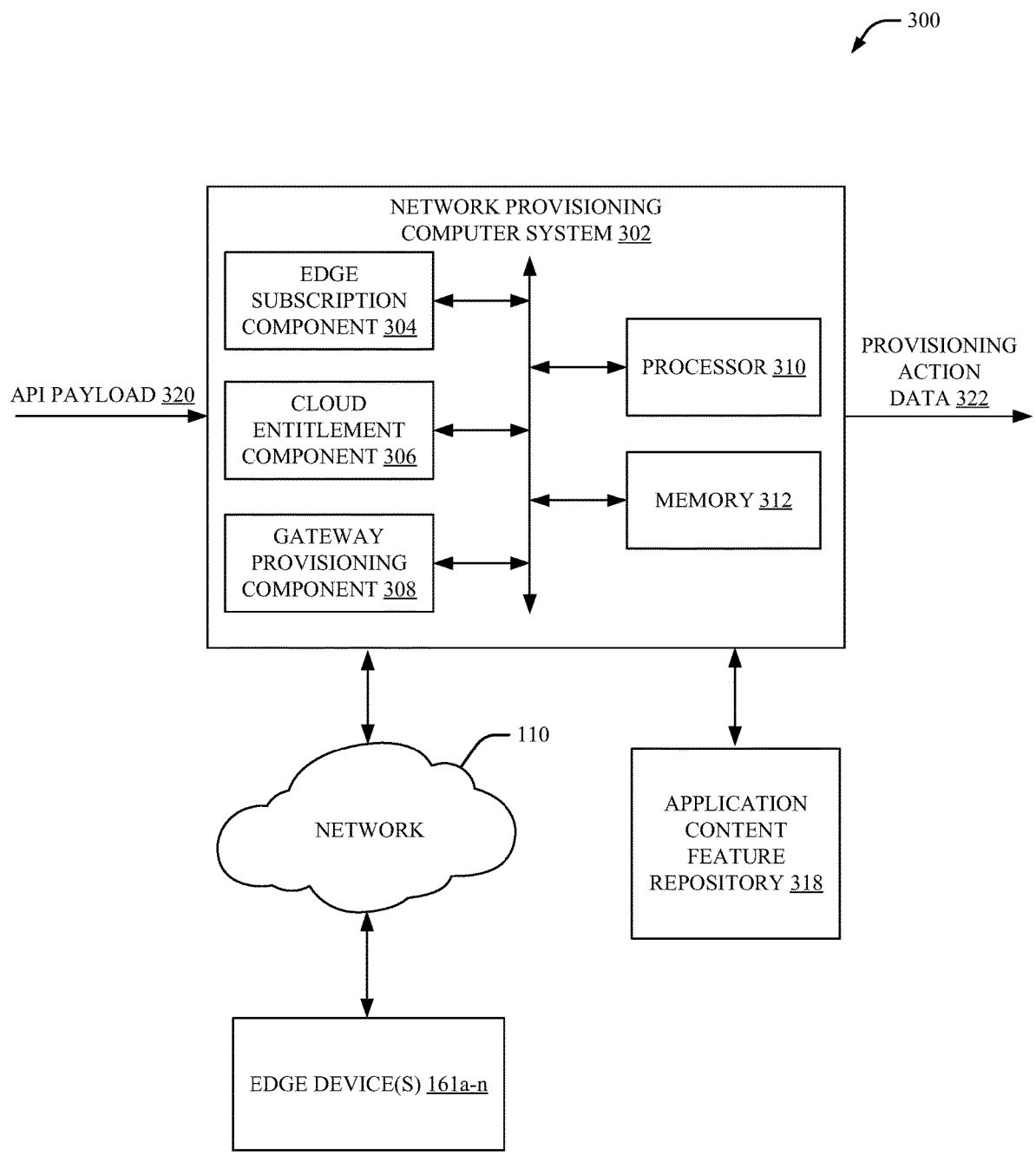
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes a network provisioning computer system 302 to facilitate a practical application of network provisioning between an edge layer and a cloud layer to provide network connectivity for one or more asset devices.

In an embodiment, the network provisioning computer system 302 is a server system (e.g., a server device, a cloud system, etc.) that facilitates network provisioning between an edge layer and a cloud layer. In another embodiment, the network provisioning computer system 302 corresponds to and/or is integrated within an edge system (e.g., an edge device) that facilitates network provisioning between an edge layer and a cloud layer. In another embodiment, the network provisioning computer system 302 corresponds to and/or is integrated within a gateway system (e.g., a gateway device) that facilitates network provisioning between an edge layer and a cloud layer. In one or more embodiments, the network provisioning computer system 302 is a device with one or more processors and a memory. In one or more embodiments, the network provisioning computer system 302 is a computer system from the computer systems 120. For example, in one or more embodiments, the network provisioning computer system 302 is implemented via the cloud 105. The network provisioning computer system 302 is also related to one or more technologies, such as, for example, network technologies, network gateway technologies, network edge technologies, cloud computing technologies, cloud database technologies, server technologies, private enterprise network technologies, wireless communication technologies, Internet of Things (IoT) technologies, industrial technologies, process plant technologies, oil and gas technologies, petrochemical technologies, refinery technologies, process plant technologies, supply chain analytics technologies, enterprise technologies, connected building technologies, data analytics technologies, digital transformation technologies, cybersecurity technologies, machine learning technologies, artificial intelligence technologies, digital processing technologies, electronic device technologies, computer technologies, asset visualization technologies, procurement technologies, and/or one or more other technologies.

Moreover, the network provisioning computer system 302 provides an improvement to one or more technologies such as network technologies, network gateway technologies, network edge technologies, cloud computing technologies, cloud database technologies, server technologies, private enterprise network technologies, wireless communication technologies, IoT technologies, industrial technologies, process plant technologies, oil and gas technologies, petrochemical technologies, refinery technologies, process plant technologies, supply chain analytics technologies, enterprise technologies, connected building technologies, data analytics technologies, digital transformation technologies, cybersecurity technologies, machine learning technologies, artificial intelligence technologies, digital processing technologies, electronic device technologies, computer technologies, asset visualization technologies, procurement technologies, and/or one or more other technologies. In an implementation, the network provisioning computer system 302 improves performance of an industrial network, an industrial control system, and/or one or more industrial assets. For example, in one or more embodiments, the network provisioning computer system 302 improves processing efficiency, reduces power consumption, reduces downtime, and/or mitigates cybersecurity risk for providing network provisioning connectivity with respect to an industrial network, an industrial control system, and/or one or more industrial assets. In another implementation, the network provisioning computer system 302 improves performance of a computing device. For example, in one or more embodiments, the network provisioning computer system 302 improves processing efficiency of a computing device (e.g., a server), reduces power consumption of a computing device (e.g., a server), improves quality of data provided by a computing device (e.g., a server), etc.

The network provisioning computer system 302 includes an edge subscription component 304, a cloud entitlement component 306 and/or a gateway provisioning component 308. Additionally, in one or more embodiments, the network provisioning computer system 302 includes a processor 310 and/or a memory 312. In certain embodiments, one or more aspects of the network provisioning computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the network provisioning computer system 302, a remote processor (e.g., a processor implemented on a server), and/or a virtual machine. In certain embodiments, the processor 310 is in communication with the memory 312, the edge subscription component 304, the cloud entitlement component 306 and/or the gateway provisioning component 308 via a bus to, for example, facilitate transmission of data among the processor 310, the memory 312, the edge subscription component 304, the cloud entitlement component 306 and/or the gateway provisioning component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the network provisioning computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

The network provisioning computer system 302 (e.g., the edge subscription component 304 of the network provisioning computer system 302) is configured to determine a set of subscription domain features associated with an industrial network system. For example, in one or more embodiments, the industrial network system includes and/or is comprised of the edge devices 161a-161n. In one or more embodiments, the edge devices 161a-161n are associated with a portfolio of assets such as, for example, a set of industrial assets. The edge devices 161a-161n include, in one or more embodiments, one or more databases, one or more assets (e.g., one or more industrial assets, one or more building assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more storage tanks, one or more boilers, one or more furnaces, one or more heat exchangers, one or more fans, one or more blowers, one or more conveyor belts, one or more vehicle components, one or more cameras, one or more displays, one or more security components, one or more HVAC components, industrial equipment, factory equipment, refinery equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the network provisioning computer system 302 via the network 110.

In one or more embodiments, the network provisioning computer system 302 (e.g., the edge subscription component 304 of the network provisioning computer system 302) receives an application programming interface (API) payload 320 to facilitate network provisioning related to the edge devices 161a-161n (e.g., the set of industrial assets) within the industrial network system. The API payload 320 can include a set of subscription domain features associated with the industrial network system. For example, metadata of the API payload 320 can include data identifying or otherwise corresponding to the set of subscription domain features. In certain embodiments, the API payload 320 can be configured as an enriched event related to the industrial network system that is augmented with the set of subscription domain features. In certain embodiments, the API payload 320 can data (e.g., metadata) that can be utilized to determine one or more subscriptions for the industrial network system.

The set of subscription domain features includes, but is not limited to, an industrial network identifier for the industrial network system, a domain identifier for the industrial network system, a domain name for the industrial network system, a tenant identifier related to the industrial network system, a product identifier for one or more products authorized for utilization by the industrial network system, a location identifier related to the industrial network system, a site identifier related to the industrial network system, a building identifier related to the industrial network system, a factory identifier related to the industrial network system, an asset identifier for one or more assets (e.g., the edge devices 161a-161n) included in the industrial network system, SKU data related to a product subscription for the industrial network system, asset information for one or more assets (e.g., the edge devices 161a-161n) included in the industrial network system, an asset digital twin specification for one or more assets (e.g., the edge devices 161a-161n) included in the industrial network system, account information for one or more users authorized to access and/or modify the industrial network system, metadata associated with one or more assets (e.g., the edge devices 161a-161n) included in the industrial network system, a sensor identifier associated with one or more assets (e.g., the edge devices 161a-161n) included in the industrial network system, and/or one or more other subscription domain features. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the API payload 320 is received in response to an action (e.g., a user-initiated action, modification of an interactive graphical element, etc.) initiated via an electronic interface of a computing device. In certain embodiments, the API payload 320 is received in response to a scan of a digital code (e.g., a barcode, a matrix barcode, a digital image, etc.) via a camera and/or a sensor of a computing device. In certain embodiments, the API payload 320 is received in response to a predetermined digital code (e.g., a subscription identifier, a string of characters, a string of numbers, etc.) being input via an electronic interface of a computing device. In other embodiments, the API payload 320 is received in response to an action (e.g., a provisioning request, a network connection request, etc.) initiated via an asset and/or a processing unit (e.g., an edge device, a controller, etc.) associated with the one or more assets.

In response to the API payload 320, the cloud entitlement component 306 initiates a network provisioning process to facilitate provisioning edge layer to cloud layer connectivity for the industrial network system. In one or more embodiments, the cloud entitlement component 306 maps the set of subscription domain features to a set of application content features associated with a cloud platform. The cloud platform can be, for example, the cloud 105 that manages, executes, and/or provides the services 145, the applications 146, and/or other functionality associated with the IoT platform 125. The set of application content features can be features related to the services 145, the applications 146, and/or other functionality associated with the IoT platform 125. For example, the set of application content features includes, but is not limited to, accessibility information, usability information, a product identifier, a product name, a product description, and/or product features for the services 145, the applications 146, and/or other functionality associated with the IoT platform 125. Additionally or alternatively, the set of application content features includes, but is not limited to, connectivity requirements, gateway information, roles, permissions, and/or workflow information for the cloud platform (e.g., the cloud 105). However, it is to be appreciated that the set of application content features can additionally or alternatively include one or more other types of application content features.

In one or more embodiments, the cloud entitlement component 306 maps the set of subscription domain features to the set of application content features based on a correlation between one or more identifiers in the set of subscription domain features and one or more identifiers in the set of application content features. For example, the cloud entitlement component 306 can map a domain identifier in the set of subscription domain features to a product identifier in the set of application content features. Additionally, the set of application content features can be correlated to a set of actions (e.g., a set of automated procedures) to execute network provisioning via a gateway (e.g., a gateway device). In one or more embodiments, the set of application content features and/or information related to one or more actions to execute network provisioning can be stored in an application content feature repository 318 communicatively coupled to the cloud entitlement component 306. In one or more embodiments, the gateway is implemented as a network node between the industrial network system and the cloud platform. In one or more embodiments, the gateway can be a gateway from the edge gateways 162a-162n. Additionally, the gateway can be configured to store and execute program instructions to facilitate data processing, data enrichment, and/or machine learning functionality related to the cloud platform. For example, the network provisioning can configure the gateway to receive data from the edge devices 161a-161n and process the data prior to sending the data to the cloud 105 via the network 110.

In one or more embodiments, the cloud entitlement component 306 generates, based at least in part on the set of application content features, a gateway profile for configuring a connection between the industrial network system and the cloud platform. The gateway profile can include the set of actions (e.g., the set of automated procedures) to execute the network provisioning via the gateway. Additionally, the gateway profile can be a profile assigned to a gateway device for configuration of services and/or applications for the industrial network. In various embodiments, the gateway profile includes a particular set of program instructions to provide a particular type of data processing, data enrichment, and/or machine learning functionality for the industrial network system via the cloud platform. For example, the gateway profile can include a particular set of program instructions to provide one or more of the services 145, the applications 146, and/or other functionality associated with the IoT platform 125 to the industrial network system. In one or more embodiments, the gateway provisioning component 308 generates provisioning action data 322 to facilitate the network provisioning process via the gateway. For example, the provisioning action data 322 can initiate one or more actions (e.g., one or more automated procedures) via the gateway to facilitate provisioning edge layer to cloud layer connectivity for the industrial network system. In one or more embodiments, the provisioning action data 322 includes or corresponds to the gateway profile.

The gateway provisioning component 308 is configured to initiate or execute a network provisioning process via the gateway. In one or more embodiments, the gateway provisioning component 308 causes execution of the gateway profile via the gateway. For example, the gateway profile can be executed via a processor of a gateway from the edge gateways 162a-162n. In response to execution of the gateway profile via the gateway, network connectivity can be established between the industrial network system and the cloud platform. For example, in response to execution of the gateway profile via the gateway, one or more assets (e.g., the edge devices 161a-161n) of the industrial network system can access the services 145, the applications 146, and/or other functionality associated with the IoT platform 125 according to the set of subscription domain features included in the API payload 320. In one or more embodiments, successful execution of the gateway profile via the gateway can cause establishment of network connectivity between the cloud 105 and the edge devices 161a-161n via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In certain embodiments, the gateway provisioning component 308 generates a report associated with the network provisioning.

In certain embodiments, the gateway provisioning component 308 generates a user-interactive electronic interface that renders a visual representation of data associated with successful completion of the network provisioning. In another embodiment, the gateway provisioning component 308 performs one or more other actions associated with the application services layer 225, the applications layer 230, and/or the core services layer 235 based on the network provisioning and/or successful completion of the network provisioning. In certain embodiments, the gateway provisioning component 308 provides a dashboard visualization to an electronic interface of a computing device based on the network provisioning and/or successful completion of the network provisioning. In one or more embodiments, the dashboard visualization includes data associated with the network provisioning and/or successful completion of the network provisioning. In certain embodiments, the gateway provisioning component 308 configures the dashboard visualization to provide individual control of one or more assets via the dashboard visualization based on the network provisioning and/or successful completion of the network provisioning. In one or more embodiments, the gateway provisioning component 308 can generate an alert for an electronic interface of a computing device in response to the network provisioning and/or successful completion of the network provisioning.

Figure 4:
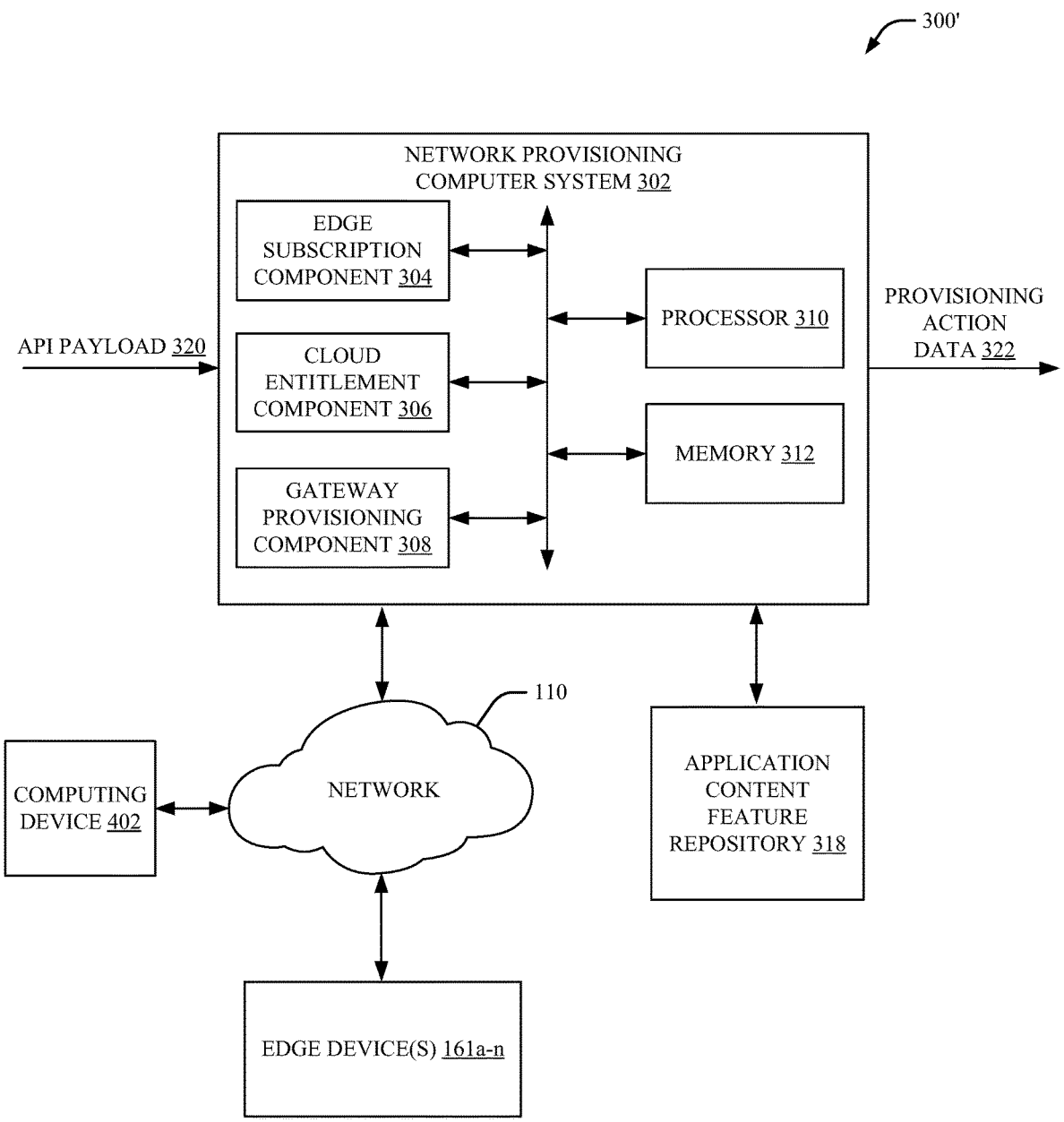
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 400 shown in FIG. 4. According to an embodiment, the system 300' includes the network provisioning computer system 302, the edge devices 161a-161n, the application content feature repository 318 and/or a computing device 402. In one or more embodiments, the network provisioning computer system 302 is in communication with the edge devices 161a-161n and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the network provisioning computer system 302.

In one or more embodiments, the gateway provisioning component 308 communicates visual data associated with the network provisioning and/or successful completion of the network provisioning to the computing device 402. For example, in one or more embodiments, the gateway provisioning component 308 can provide one or more visual elements for a visual display (e.g., a user-interactive electronic interface) of the computing device 402 that renders a visual representation of the data associated with the network provisioning and/or successful completion of the network provisioning. In certain embodiments, the visual display of the computing device 402 displays one or more graphical elements associated with the network provisioning and/or successful completion of the network provisioning. In another example, in one or more embodiments, the visual display renders one or notifications associated with the network provisioning and/or successful completion of the network provisioning. In one or more embodiments, visual data rendered via the visual display allows a user associated with the computing device 402 to make decisions and/or perform one or more actions performed with respect to the network provisioning and/or successful completion of the network provisioning. In one or more embodiments, the visual display allows a user associated with the computing device 402 to control the one or more portions of the one or more assets (e.g., one or more portions of the edge devices 161a-161n). In one or more embodiments, the visual display renders a report associated with the network provisioning and/or successful completion of the network provisioning via a display of the computing device 402. In certain embodiments, the API payload 320 can be generated and/or transmitted via one or more actions with respect to the visual display of the computing device 402. In certain embodiments, the API payload 320 can be generated and/or transmitted via one or more actions with respect to a camera and/or a sensor of the computing device 402.

Figure 5:
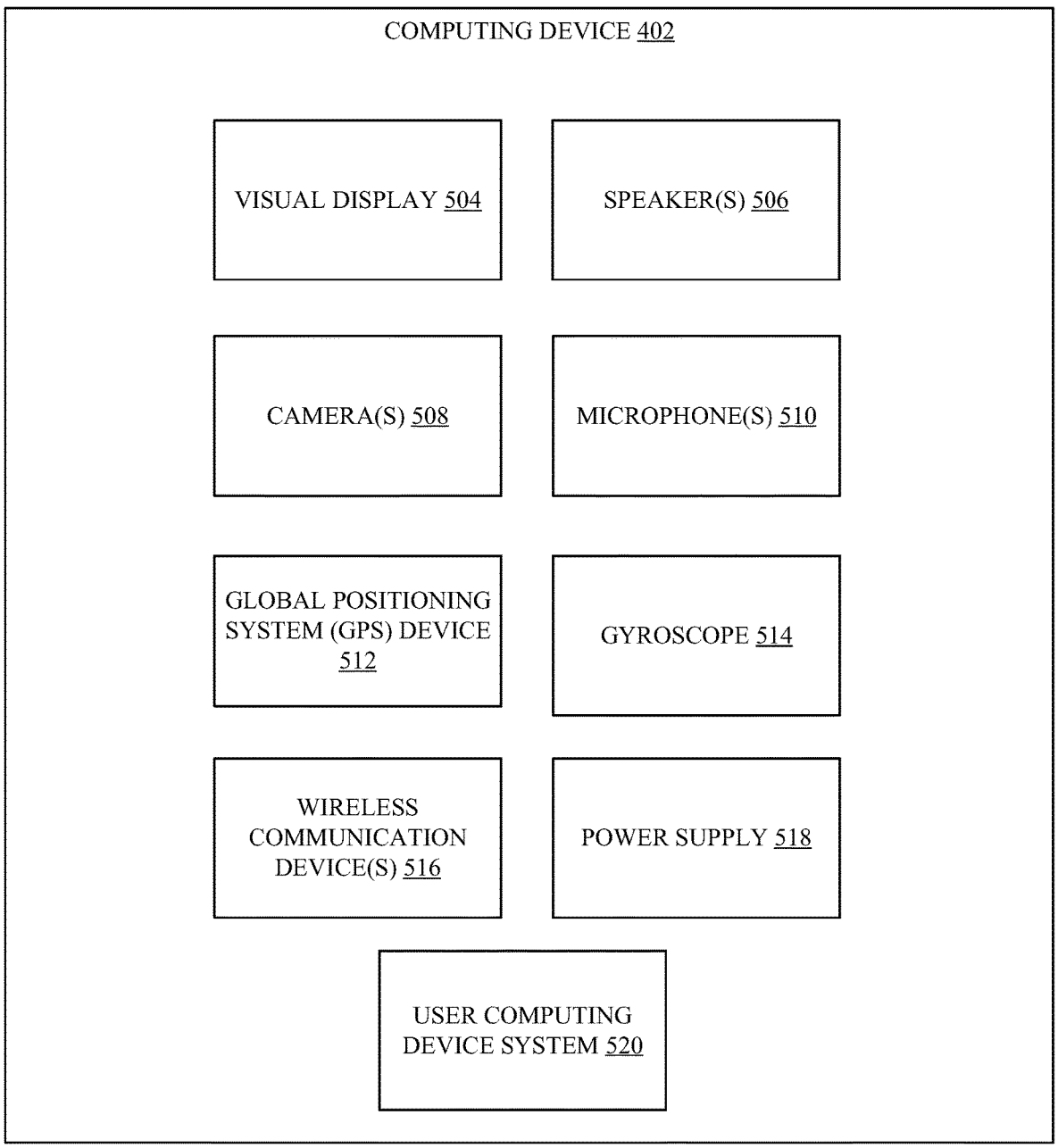
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the cybersecurity assessment. The computing device 402 includes mechanical components, electrical components, hardware components and/or software components. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, a power supply 518, and/or a computing device system 520.

In an embodiment, the visual display 504 is a display that facilitates presentation and/or interaction with one or more portions of dashboard visualization data. In one or more embodiments, the computing device 402 displays an electronic interface (e.g., a graphical user interface) associated with a network provisioning platform. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. The one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, data associated with the network provisioning and/or successful completion of the network provisioning is presented via the visual display 504 and/or the one or more speakers 506.

Figure 6:
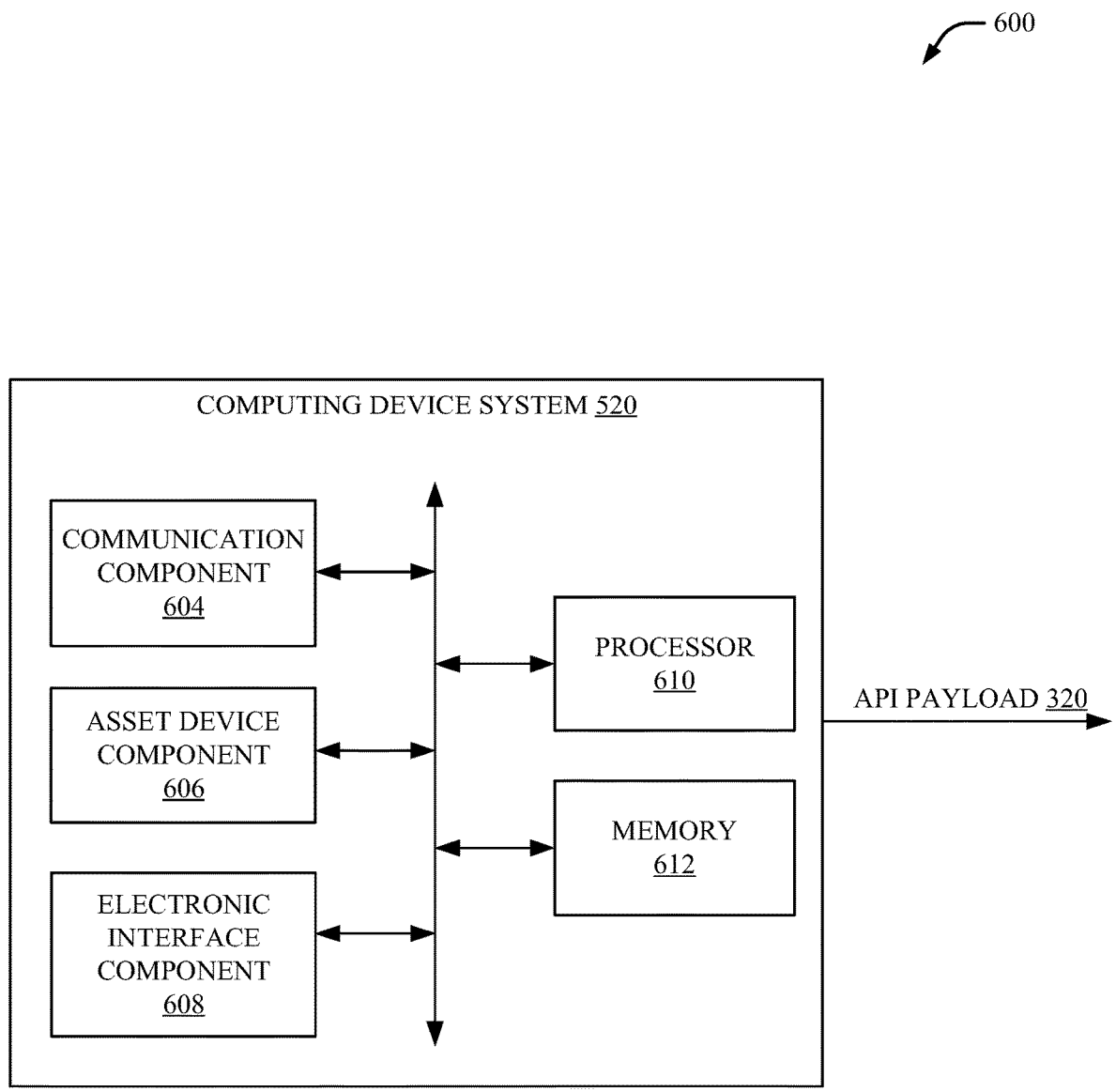
FIG. 6 illustrates an exemplary system, in accordance with one or more embodiments described herein.

FIG. 6 illustrates a system 600 that provides an exemplary environment according to one or more described features of one or more embodiments of the disclosure. According to an embodiment, the system 600 includes the computing device system 520 to provide a practical application of initiating network provisioning. In one or more embodiments, the user computing device system 620 provides a practical application of transmitting requests to perform network provisioning related the network 110. In one or more embodiments, the computing device system 520 provides a practical application of receiving and rendering visual data comprising visual representations related to the network provisioning.

In an embodiment, the computing device system 520 facilitates interaction with the network provisioning computer system 302. The computing device system 520 includes a communication component 604, an asset device component 606, and/or an electronic interface component 608. Additionally, in one or more embodiments, the computing device system 520 includes a processor 610 and/or a memory 612. In certain embodiments, one or more aspects of the computing device system 520 (and/or other systems, apparatuses and/or processes disclosed herein) constitute executable instructions embodied within a computer-readable storage medium (e.g., the memory 612). For instance, in an embodiment, the memory 612 stores computer executable component and/or executable instructions (e.g., program instructions). Furthermore, the processor 610 facilitates execution of the computer executable components and/or the executable instructions (e.g., the program instructions). In an example embodiment, the processor 610 is configured to execute instructions stored in the memory 512 or otherwise accessible to the processor 610.

The processor 610 is a hardware entity (e.g., physically embodied in circuitry) capable of performing operations according to one or more embodiments of the disclosure. Alternatively, in an embodiment where the processor 610 is embodied as an executor of software instructions, the software instructions configure the processor 610 to perform one or more algorithms and/or operations described herein in response to the software instructions being executed. In an embodiment, the processor 610 is a single core processor, a multi-core processor, multiple processors internal to the user computing device system 620, a remote processor (e.g., a processor implemented on a server), and/or a virtual machine. In certain embodiments, the processor 610 is in communication with the memory 612, the communication component 604, the asset device component 606 and/or the electronic interface component 608 via a bus to, for example, facilitate transmission of data among the processor 610, the memory 612, the communication component 604, the asset device component 606, and/or electronic interface component 608. The processor 610 may be embodied in a number of different ways and, in certain embodiments, includes one or more processing devices configured to perform independently. Additionally or alternatively, in one or more embodiments, the processor 610 includes one or more processors configured in tandem via a bus to enable independent execution of instructions, pipelining of data, and/or multi-thread execution of instructions.

The memory 612 is non-transitory and includes, for example, one or more volatile memories and/or one or more non-volatile memories. In other words, in one or more embodiments, the memory 612 is an electronic storage device (e.g., a computer-readable storage medium). The memory 612 is configured to store information, data, content, one or more applications, one or more instructions, or the like, to enable the computing device system 520 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In one or more embodiments, the communication component 604 is configured to generate the API payload 320. In various embodiments, the communication component 604 generates the API payload 320 in response to an action performed with respect to a user interface configuration for an interactive user interface rendered on a visual display via the electronic interface component 608. The action can be, for example, initiating execution of an application (e.g., a mobile application) via a user computing device that presents the interactive user interface, altering an interactive graphical element via the interactive user interface, capturing a digital code, or another type of action with respect to the interactive user interface rendered via the electronic interface component 608. Additionally or alternatively, in certain embodiments, the communication component 604 generates the API payload 320 in response to an action performed with respect to the camera 508 and/or GPS device 512 of the computing device 402. Additionally or alternatively, in one or more embodiments, the communication component 604 generates the API payload 320 in response to execution of a user authentication process via a user computing device. For example, in an embodiment, the user authentication process is associated with password entry, facial recognition, biometric recognition, security key exchange, and/or another security technique associated with the computing device 402. In various embodiments, an interactive user interface is configured via the electronic interface component 608 as a dashboard visualization. In various embodiments, the communication component 604 is configured to transmit the API payload 320. In one or more embodiments, the communication component 604 transmits the API payload 320 to the network provisioning computer system 302. In one or more embodiments, the communication component 604 transmits the API payload 320 via the network 110.

In one or more embodiments, in response to the API payload 320, the communication component 604 and/or the asset device component 606 is configured to receive the visual data associated with network provisioning from the network provisioning computer system 302. In certain embodiments, the communication component 604 and/or the asset device component 606 incorporates encryption capabilities to facilitate encryption and/or decryption of one or more portions of the visual data. Additionally, the asset device component 606 can work in conjunction with the electronic interface component 608 to render a visualization associated with the visual data.

In one or more embodiments, the electronic interface component 608 renders the visual data as respective interactive display elements on an interactive user interface. An interactive display element is a portion of the interactive user interface (e.g., a user-interactive electronic interface portion) that provides interaction with respect to a user of the computing device 402. For example, in one or more embodiments, an interactive display element is an interactive display element associated with a set of pixels that allows a user to provide feedback and/or to perform one or more actions with respect to the interactive user interface. In an embodiment, in response to interaction with an interactive display element, the interactive user interface is dynamically altered to display one or more altered portions of the interactive user interface associated with different visual data and/or different interactive display elements. Additionally, in one or more embodiments, the electronic interface component 608 is configured to facilitate execution and/or initiation of one or more actions via an interactive user dashboard. In an embodiment, an action is executed and/or initiated via an interactive display element of the interactive user dashboard. In certain embodiments, the interactive user interface presents one or more notifications associated with network provisioning.

Figure 7:
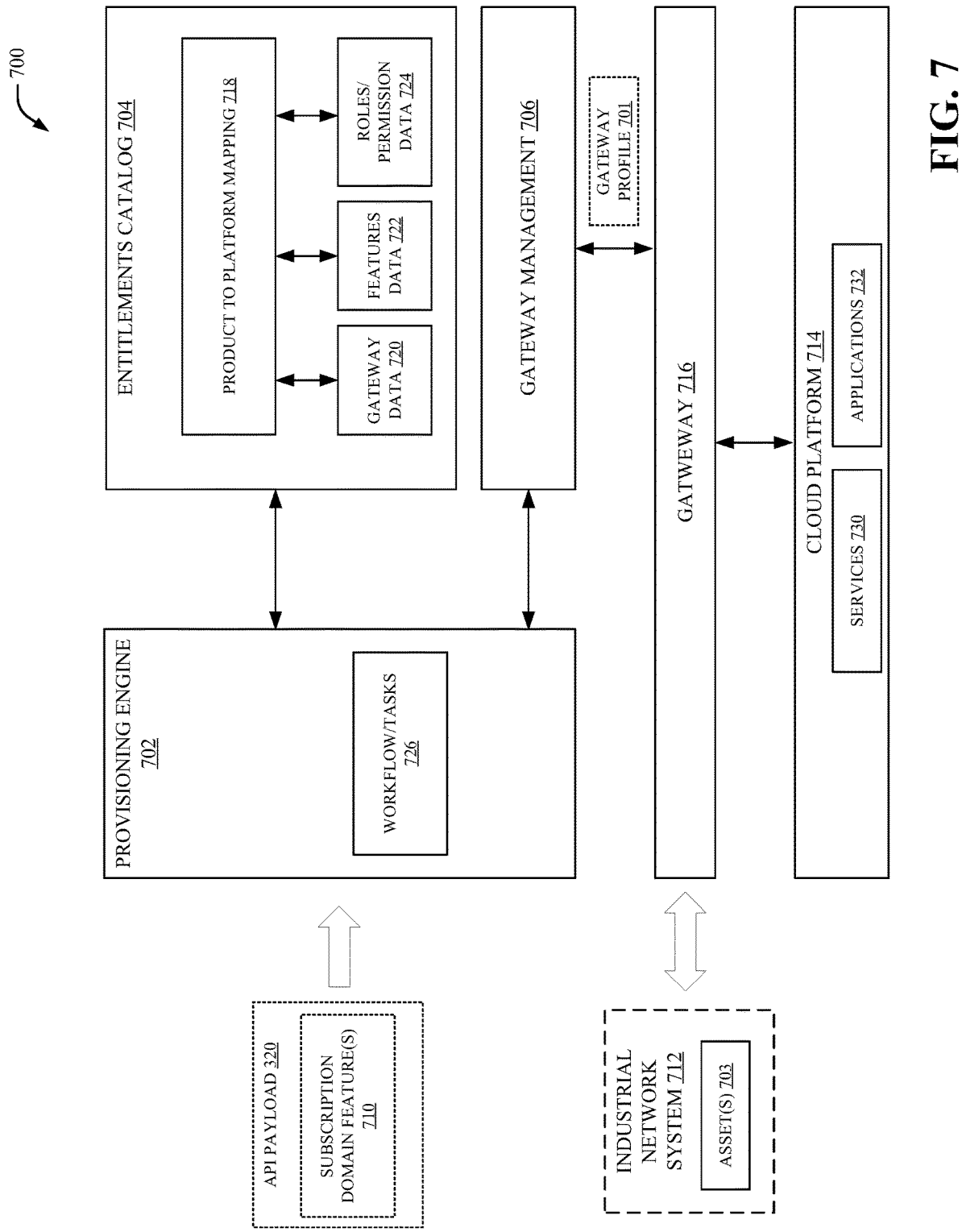
FIG. 7 illustrates another exemplary system, in accordance with one or more embodiments described herein.

FIG. 7 illustrates a system 700 according to one or more described features of one or more embodiments of the disclosure. The system 700 includes a provisioning engine 702, an entitlements catalog 704, gateway management 706, and/or a gateway 708. In various embodiments, the provisioning engine 702, the entitlements catalog 704, and/or the gateway management 706 correspond to respective functionality of the network provisioning computer system 302. Additionally, in various embodiments, the gateway 708 corresponds to a gateway from the edge gateways 162*a*-162*n*. The provisioning engine 702 can receive the API payload 320. The API payload 320 can be configured to include at least a set of subscription domain features 710. For example, the set of subscription domain features 710 can be embedded in metadata or another portion of the API payload 320.

The set of subscription domain features 710 includes, but is not limited to, an industrial network identifier for an industrial network system, a domain identifier for the industrial network system, a domain name for the industrial network system, a tenant identifier related to the industrial network system, a product identifier for one or more products authorized for utilization by the industrial network system, a location identifier related to the industrial network system, a site identifier related to the industrial network system, a building identifier related to the industrial network system, a factory identifier related to the industrial network system, an asset identifier for one or more assets included in the industrial network system, SKU data related to a product subscription for the industrial network system, asset information for one or more assets included in the industrial network system, an asset digital twin specification for one or more assets included in the industrial network system, account information for one or more users authorized to access and/or modify the industrial network system, metadata associated with one or more assets included in the industrial network system, a sensor identifier associated with one or more assets included in the industrial network system, and/or one or more other subscription domain features.

The provisioning engine 702 can manage network provisioning between an industrial network system 712 and a cloud platform 714 via a gateway 716. For example, the provisioning engine 702 can execute a network provisioning process based on the set of subscription domain features 710 included in the API payload 320 to provide network connectivity between the industrial network system 712 and the cloud platform 714 via the gateway 716. In various embodiments, the provisioning engine 702 employs entitlements information associated with the entitlements catalog 704 to facilitate the network provisioning process. For example, in one or more embodiments, the entitlements catalog 704 includes a product to platform mapping 718 that maps product features related to subscriptions for industrial network systems to services 730 and/or applications 732 provided by the cloud platform 714. In various embodiments, the product to platform mapping 718 employs gateway data 720 related to the gateway 716, features data 722 related to the services 730 and/or applications 732, and/or roles/permission data 724 related to the gateway 716 to provide the product to platform mapping 718.

In one or more embodiments, the product to platform mapping 718 can map the set of subscription domain features 710 to a set of application content features associated with the cloud platform 714. For example, the product to platform mapping 718 can map the set of subscription domain features 710 to a set of application content features associated with the services 730 and/or applications 732 of the cloud platform 714. The set of application content features can include one or more features from the gateway data 720, the features data 722, and/or the roles/permission data 724. For example, the set of application content features can include, but is not limited to, accessibility information for the gateway 716, usability information for the gateway 716, connectivity requirements for the gateway 716, a product identifier for the services 730 and/or applications 732, a product name for the services 730 and/or applications 732, a product description for the services 730 and/or applications 732, product features for the services 730 and/or applications 732, user roles and/or permissions for the gateway 716, authorization requirements for the gateway 716, and/or one or more other application content features.

Based on the product to platform mapping 718, the provisioning engine 702 can generate workflow/tasks 726. The workflow/tasks 726 can include set of actions (e.g., a set of automated procedures) to execute network provisioning via the gateway 716 to provide network connectivity between the industrial network system 712 and the cloud platform 714 via the gateway 716. In one or more embodiments, the gateway management 706 transmits a gateway profile 701 associated with the workflow/tasks 726 to the gateway 716. For example, the gateway management 706 can cause execution of the gateway profile 701 via the gateway 715. Execution of the gateway profile 701 can include performing the workflow/tasks 726 in order to configure a connection between the industrial network system 712 and the cloud platform 714. In one or more embodiments, successful execution of the gateway profile 701 can result in the industrial network system 712 and/or one or more assets 703 of the industrial network system 712 being enabled with data processing functionality, machine learning functionality, data enrichment functionality, asset performance management functionality, and/or other functionality via the services 730 and/or applications 732 of the cloud platform 714.

Figure 8:
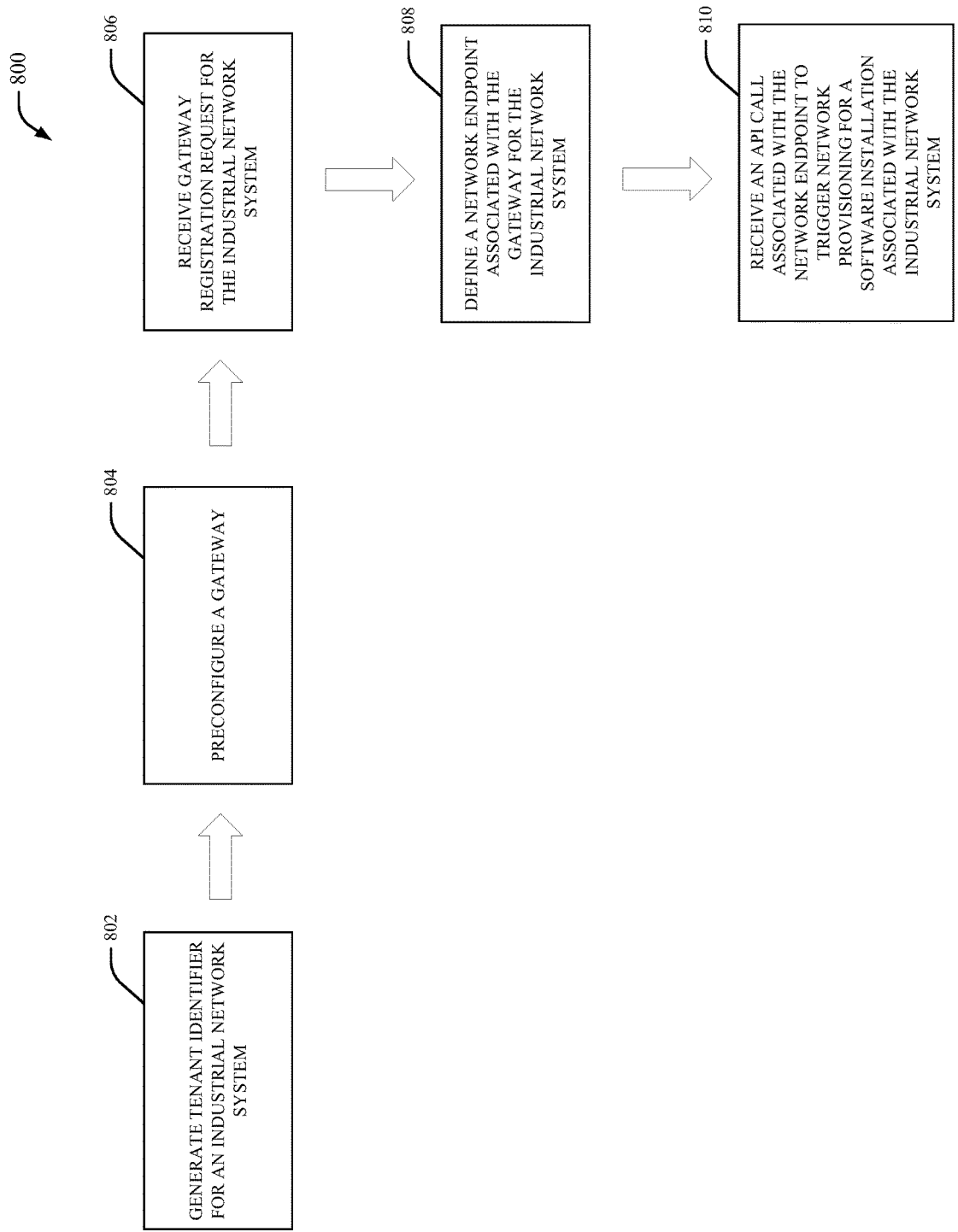
FIG. 8 illustrates an exemplary flow diagram associated with network provisioning, in accordance with one or more embodiments described herein.

FIG. 8 illustrates a flow diagram 800 according to one or more described features of one or more embodiments of the disclosure. In one or more embodiments, the steps of the flow diagram 800 can be performed by the network provisioning computer system 302. The flow diagram 800 includes a step 802 that generates a tenant identifier for an industrial network system. For example, the tenant identifier can be a globally unique identifier (GUID) for the industrial network system. The flow diagram 800 additionally or alternatively includes a step 804 that preconfigures a gateway. For example, a gateway node can be preconfigured with a gateway node identifier and/or a network address (e.g., an internet protocol address). The flow diagram 800 additionally or alternatively includes a step 806 that receives a gateway registration request for the industrial network system. For example, the gateway registration request can include a request to establish a network connection between the industrial network system and the gateway node. In certain embodiments, the gateway registration request can include the tenant identifier (e.g., the GUID) for the industrial network system and/or the gateway node identifier. The flow diagram 800 additionally or alternatively includes a step 808 that defines a network endpoint associated with the gateway for the industrial network system. For example, the network endpoint can be a representational state transfer (REST) endpoint for the gateway. The flow diagram 800 additionally or alternatively includes a step 810 that receives an API call associated with the network endpoint to trigger network provisioning for a software installation associated with the industrial network system. For example, the API call can correspond to the API payload 320 that includes the set of subscription domain features 710.

Figure 9:
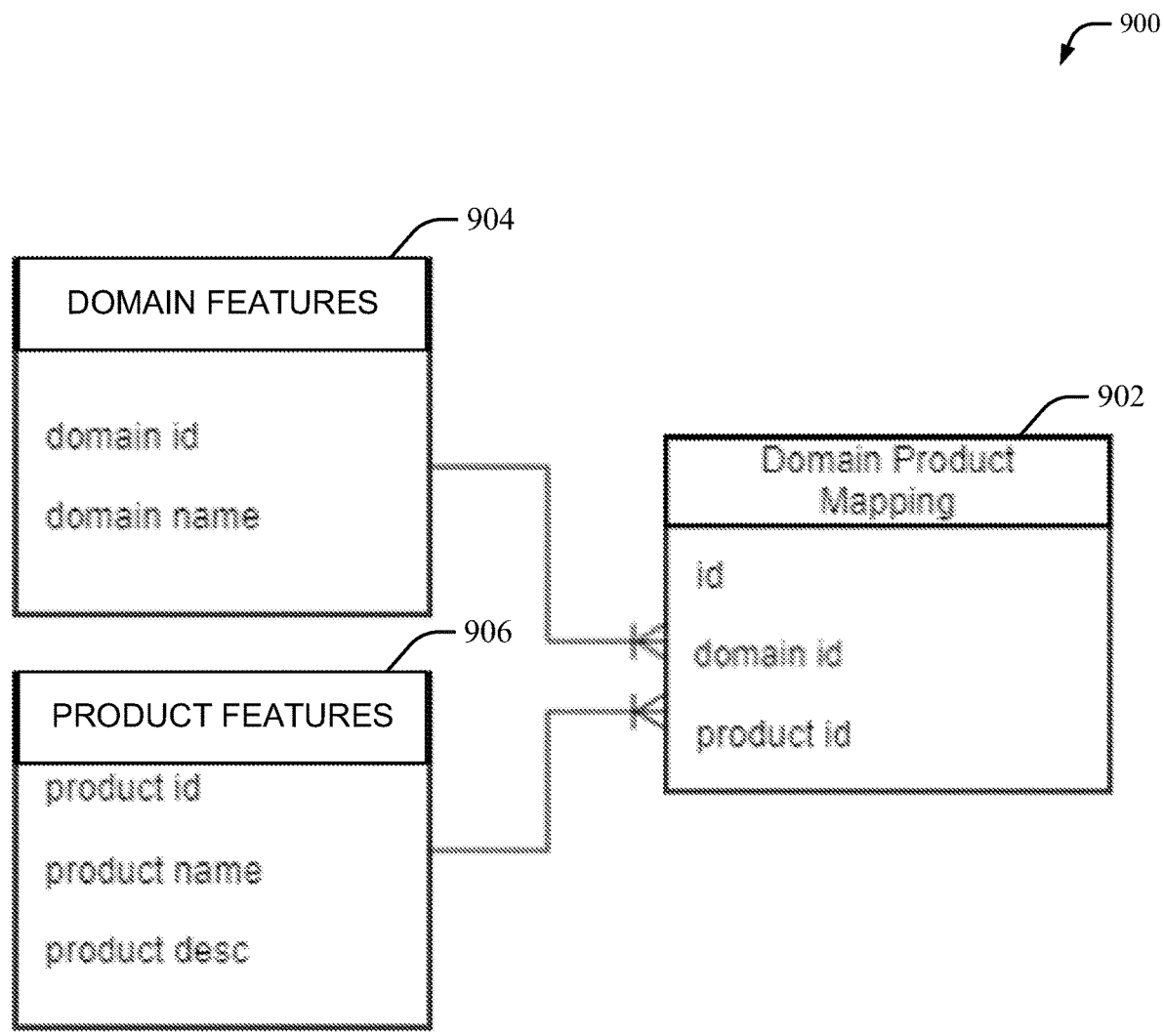
FIG. 9 illustrates an exemplary data mapping model, in accordance with one or more embodiments described herein.

FIG. 9 illustrates a data mapping model 900 according to one or more described features of one or more embodiments of the disclosure. The data mapping model 900 can be, for example, a domain and product data model associated with product to platform mapping. For example, domain product mapping 902 can be configured to map domain features 904 to product features 906. In one or more embodiments, the domain product mapping 902 can be configured as a product to platform mapping to map a set of subscription domain features associated with an industrial network system to a set of application content features associated with a cloud platform. For instance, the domain features 904 can include a domain identifier, a domain name, and/or one or more other subscription domain features associated with an industrial network system. In one or more embodiments, the domain features 904 and/or data associated therewith can be included in the API payload 320. Additionally, the domain product mapping 902 can map the domain features 904 to one or more product features of the product features 906 such as, for example, a product identifier, a product name, a product description, and/or one or more other application content features.

Figure 10:
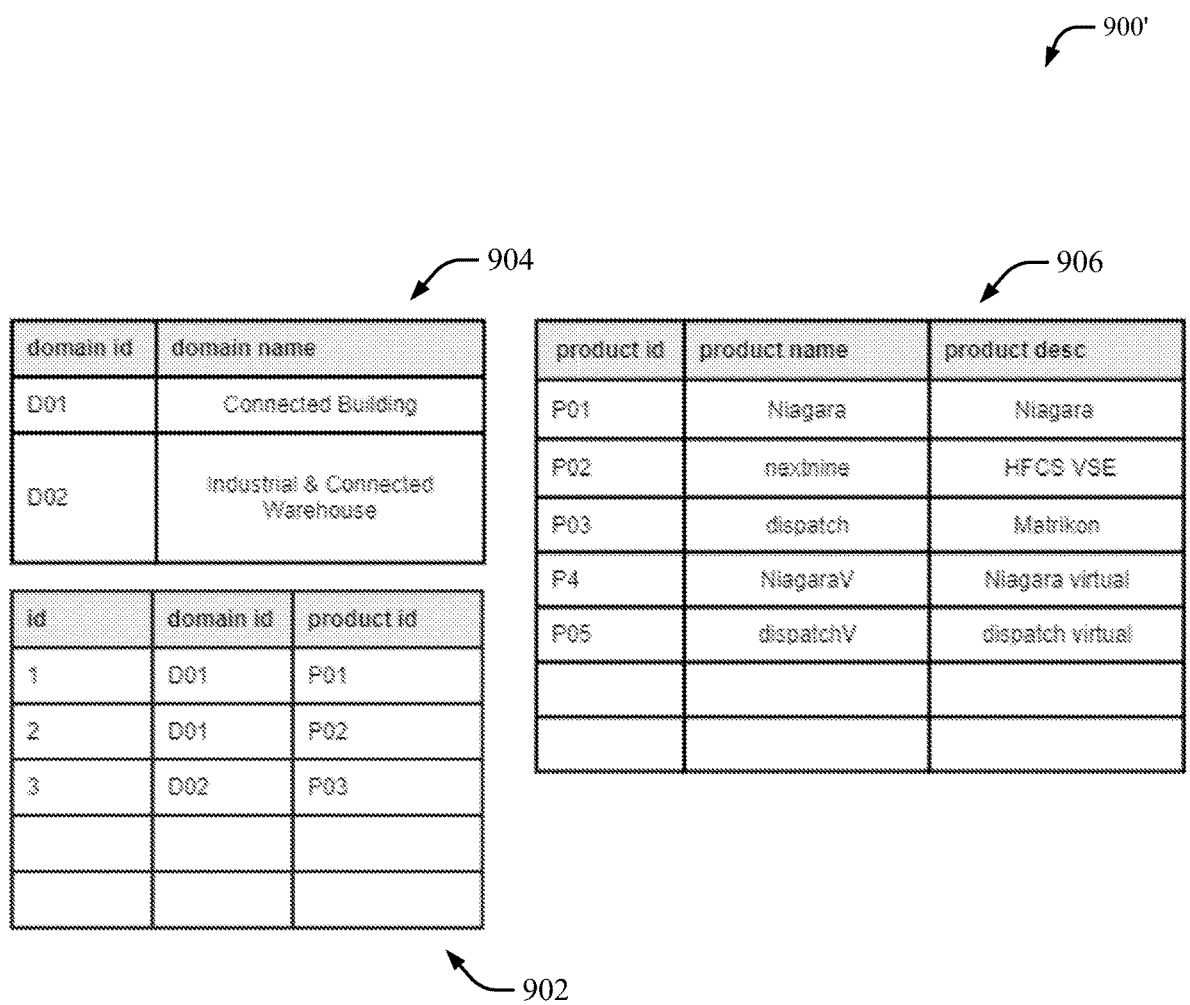
FIG. 10 illustrates another exemplary data mapping model, in accordance with one or more embodiments described herein.

FIG. 10 illustrates a data mapping model 900' according to one or more described features of one or more embodiments of the disclosure. The data mapping model 900' can provide further details related to the data mapping model 900. For example, a domain identifier "D01" for the domain features 904 can be correlated to a "Connected Building" domain name for a first type of enterprise vertical, a domain identifier "D02" for the domain features 904 can be correlated to an "Industrial & Connected Warehouse" domain name for a second type of enterprise vertical, etc. Additionally, a product identifier "P01" for the product features 906 can be correlated to a product name "Niagara" and a product description "Niagara", a product identifier "P02" for the product features 906 can be correlated to a product name "nextnine" and a product description "HFCS VSE", a product identifier "P03" for the product features 906 can be correlated to a product name "dispatch" and a product description "Matrikon", a product identifier "P04" for the product features 906 can be correlated to a product name "NiagaraV" and a product description "Niagara virtual", a product identifier "P05" for the product features 906 can be correlated to a product name "dispatchV" and a product description "dispatch virtual", etc. Additionally, the domain product mapping 902 can correlate respective identifiers, domain identifiers, and/or product identifiers, etc. For example, an identifier "1" and a domain identifier "D01" can be correlated to a product identifier "P01".

Figure 11:
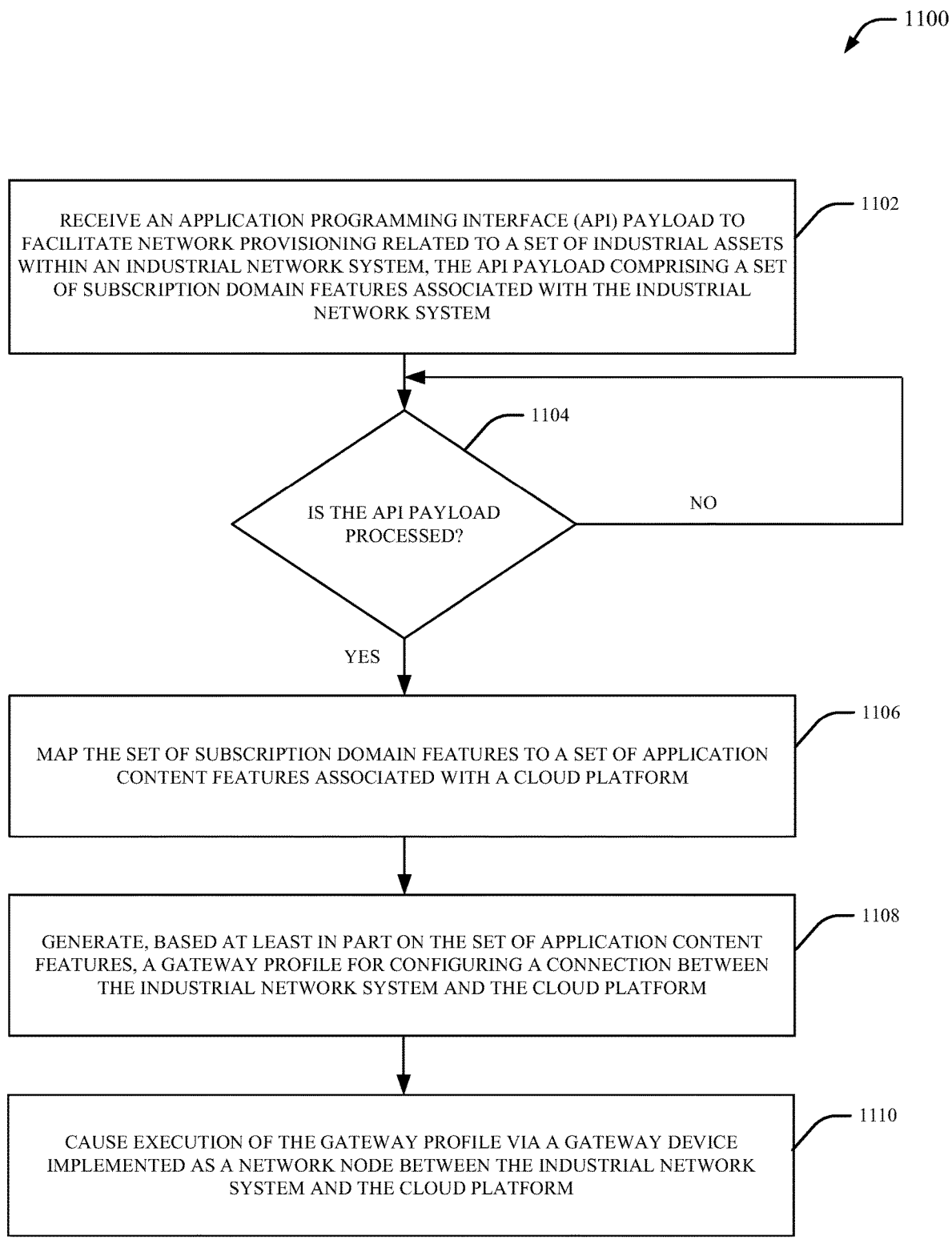
FIG. 11 illustrates a flow diagram for provisioning edge layer to cloud layer connectivity for asset devices, in accordance with one or more embodiments described herein.

FIG. 11 illustrates a method 1100 for provisioning edge layer to cloud layer connectivity for asset devices, in accordance with one or more embodiments described herein. The method 1100 is associated with the network provisioning computer system 302, for example. For instance, in one or more embodiments, the method 1100 is executed at a device (e.g., the network provisioning computer system 302) with one or more processors and a memory. In one or more embodiments, the method 1100 begins at block 1102 that receives (e.g., by the cloud entitlement component 306) receives an application programming interface (API) payload to facilitate network provisioning related to a set of industrial assets within an industrial network system. In one or more embodiments, the API payload comprises a set of subscription domain features associated with the industrial network system. In one or more embodiments, the set of subscription domain features is extracted from metadata of the API payload.

At block 1104, it is determined whether the API payload is processed. For example, it can be determined whether the set of subscription domain features is successfully extracted from the API payload and/or whether the API payload is successfully correlated to a gateway. If no, block 1104 is repeated to determine whether the API payload is processed. If yes, the method 1100 proceeds to block 1106.

In response to the request, block 1106 maps (e.g., by the cloud entitlement component 306) the set of subscription domain features to a set of application content features associated with a cloud platform. In response to the request, the method 1100 additionally or alternatively includes a block 1108 that generates (e.g., by the cloud entitlement component 306) a gateway profile for configuring a connection between the industrial network system and the cloud platform based at least in part on the set of application content features. In response to the request, the method 1100 additionally or alternatively includes a block 1110 that causes (e.g., by the gateway provisioning component 308) execution of the gateway profile via a gateway device implemented as a network node between the industrial network system and the cloud platform.

In one or more embodiments, the method 1100 additionally or alternatively includes correlating a tenant identifier included in the set of subscription domain features to a product identifier included in the set of application content features to determine a set of automated procedures for the gateway profile.

In one or more embodiments, the method 1100 additionally or alternatively includes triggering execution of one or more actions that initiate with respect to the gateway device based at least in part on the gateway profile.

In one or more embodiments, the method 1100 additionally or alternatively includes translating the set of subscription domain features into a set of automated procedures for execution via the gateway device based at least in part on the set of application content features.

In one or more embodiments, the method 1100 additionally or alternatively includes causing execution of the gateway profile via the gateway device based at least in part on a set of network connectivity rules included in the set of application content features.

In one or more embodiments, the method 1100 additionally or alternatively includes mapping the set of subscription domain features to the set of application content features to identify one or more applications associated with the cloud platform for subscription by the industrial network system. The one or more applications can include one or more data processing applications, one or more machine learning models, and/or one or more other applications hosted and/or executed by the cloud platform.

In one or more embodiments, the method 1100 additionally or alternatively includes determining a set of extensibility features for generating extensible object data for a dashboard visualization based at least in part on the set of application content features.

In one or more embodiments, the method 1100 additionally or alternatively includes enable the industrial network system to access to one or more data processing applications associated with the cloud platform via execution of the gateway profile. Additionally or alternatively, in one or more embodiments, the method 1100 includes enabling the industrial network system to access to one or more machine learning models associated with the cloud platform via execution of the gateway profile.

Figure 12:
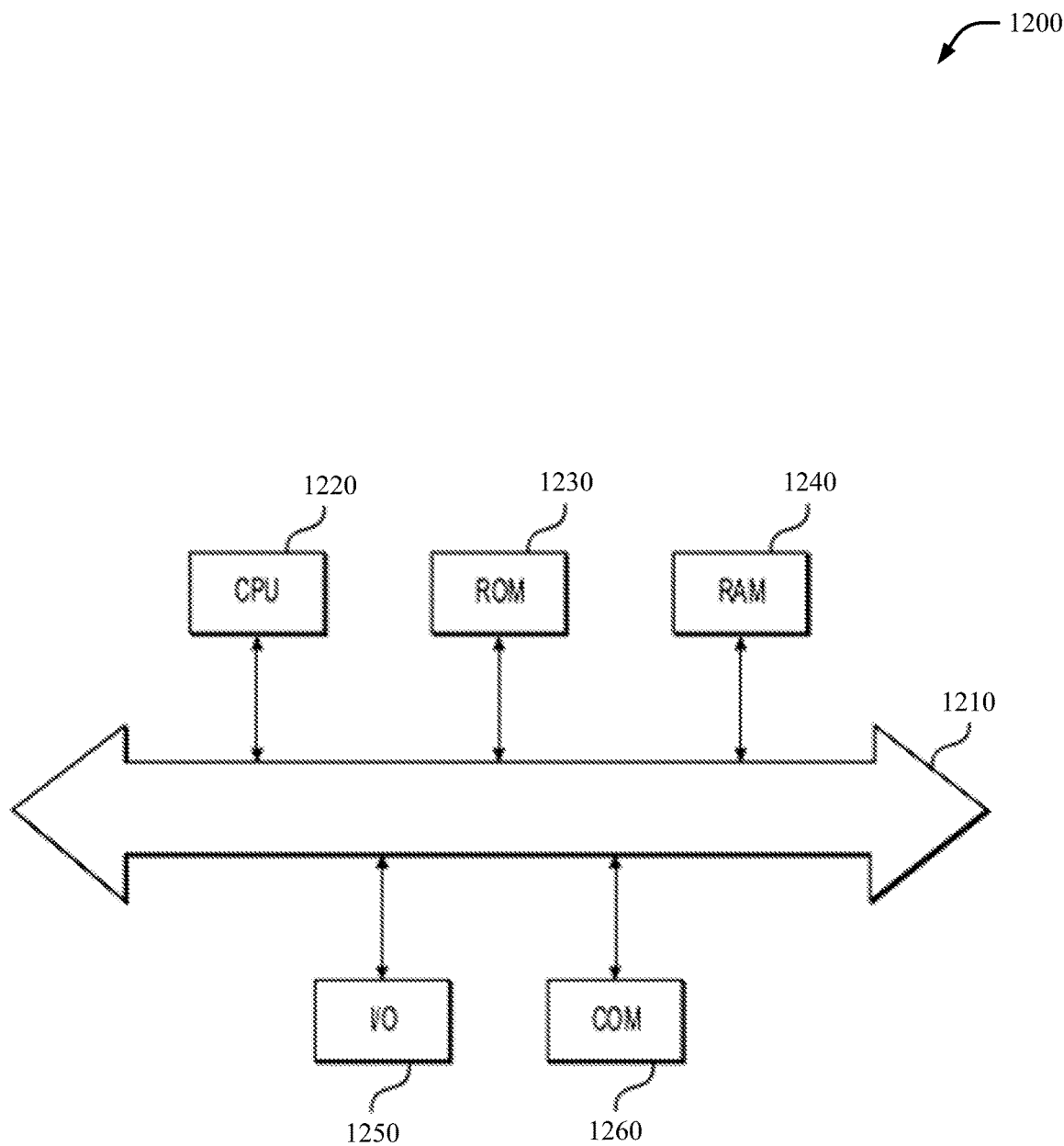
FIG. 12 illustrates a functional block diagram of a computer that may be configured to execute techniques described in accordance with one or more embodiments described herein.

FIG. 12 depicts an example system 1200 that may execute techniques presented herein. FIG. 12 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1260 for packet data communication. The platform also may include a central processing unit ("CPU") 1220, in the form of one or more processors, for executing program instructions. The platform may include an internal communication bus 1210, and the platform also may include a program storage and/or a data storage for various data files to be processed and/or communicated by the platform such as ROM 1230 and RAM 1240, although the system 1200 may receive programming and data via network communications. The system 1200 also may include input and output ports 1250 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the embodiments set forth herein will come to mind to one skilled in the art to which these embodiments pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the embodiments are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A computer-implemented method comprising:
   receiving an application programming interface (API) payload that facilitates network provisioning related to a set of industrial assets within an industrial network system;
   extracting, from the API payload, a set of subscription domain features that includes at least a domain identifier for the industrial network system;
   mapping at least the domain identifier for the industrial network system to a set of application content features associated with a cloud platform that is distinct from the industrial network system, wherein the set of application content features includes at least a product identifier for one or more services or applications of the cloud platform;
   correlating a tenant identifier included in the set of subscription domain features to the product identifier included in the set of application content features to determine a set of automated procedures for a gateway profile;
   generating, based at least in part on the set of application content features, the gateway profile for configuring a connection between the industrial network system and the cloud platform; and
   causing execution of the gateway profile via a gateway device implemented as a network node between the industrial network system and the cloud platform.

2. The computer-implemented method of claim 1, further comprising:
   extracting the set of subscription domain features from metadata of the API payload.

3. The computer-implemented method of claim 1, further comprising:
   triggering execution of one or more actions that initiate with respect to the gateway device based at least in part on the gateway profile.

4. The computer-implemented method of claim 1, further comprising:
   translating the set of subscription domain features into a set of automated procedures for execution via the gateway device based at least in part on the set of application content features.

5. The computer-implemented method of claim 1, further comprising:
   causing execution of the gateway profile via the gateway device based at least in part on a set of network connectivity rules included in the set of application content features.

6. The computer-implemented method of claim 1, further comprising:
   mapping the set of subscription domain features to the set of application content features to identify one or more applications associated with the cloud platform for subscription by the industrial network system.

7. A system, comprising:
   one or more processors;
   a memory; and
   one or more programs stored in the memory, the one or more programs comprising instructions configured to:
   receive an application programming interface (API) payload that facilitates network provisioning related to a set of industrial assets within an industrial network system;
   extract, from the API payload, a set of subscription domain features that includes at least a domain identifier for the industrial network system;
   map at least the domain identifier for the industrial network system to a set of application content features associated with a cloud platform that is distinct from the industrial network system, wherein the set of application content features includes at least a product identifier for one or more services or applications of the cloud platform;
   correlate a tenant identifier included in the set of subscription domain features to the product identifier included in the set of application content features to determine a set of automated procedures for a gateway profile;
   generate, based at least in part on the set of application content features, the gateway profile for configuring a connection between the industrial network system and the cloud platform; and
   cause execution of the gateway profile via a gateway device implemented as a network node between the industrial network system and the cloud platform.

8. The system of claim 7, the one or more programs further comprising instructions configured to:
   extract the set of subscription domain features from metadata of the API payload.

9. The system of claim 7, the one or more programs further comprising instructions configured to:
   trigger execution of one or more actions that initiate with respect to the gateway device based at least in part on the gateway profile.

10. The system of claim 7, the one or more programs further comprising instructions configured to:
    translate the set of subscription domain features into a set of automated procedures for execution via the gateway device based at least in part on the set of application content features.

11. The system of claim 7, the one or more programs further comprising instructions configured to:
    cause execution of the gateway profile via the gateway device based at least in part on a set of network connectivity rules included in the set of application content features.

12. The system of claim 7, the one or more programs further comprising instructions configured to:

determine a set of extensibility features for generating extensible object data for a dashboard visualization based at least in part on the set of application content features.

13. The system of claim 7, the one or more programs further comprising instructions configured to:
map the set of subscription domain features to the set of application content features to identify one or more applications associated with the cloud platform for subscription by the industrial network system.

14. The system of claim 7, the one or more programs further comprising instructions configured to:
enable the industrial network system to access to one or more data processing applications associated with the cloud platform via execution of the gateway profile.

15. The system of claim 7, the one or more programs further comprising instructions configured to:
enable the industrial network system to access to one or more machine learning models associated with the cloud platform via execution of the gateway profile.

16. A computer program product comprising at least one non-transitory computer-readable storage medium having computer-readable program code portions stored therein, the computer-readable program code portions comprising an executable portion configured to:
receive an application programming interface (API) payload that facilitates network provisioning related to a set of industrial assets within an industrial network system;
extract, from the API payload, a set of subscription domain features that includes at least a domain identifier for the industrial network system;
map at least the domain identifier for the industrial network system to a set of application content features associated with a cloud platform that is distinct from the industrial network system, wherein the set of application content features includes at least a product identifier for one or more services or applications of the cloud platform;
correlate a tenant identifier included in the set of subscription domain features to the product identifier included in the set of application content features to determine a set of automated procedures for a gateway profile;
generate, based at least in part on the set of application content features, the gateway profile for configuring a connection between the industrial network system and the cloud platform; and
cause execution of the gateway profile via a gateway device implemented as a network node between the industrial network system and the cloud platform.

17. The computer program product of claim 16, the computer-readable program code portions further comprising an executable portion configured to:
extract the set of subscription domain features from metadata of the API payload.

* * * * *